US012320497B2

(12) United States Patent
Okada et al.

(10) Patent No.: US 12,320,497 B2
(45) Date of Patent: Jun. 3, 2025

(54) LIGHTING DEVICE

(71) Applicant: Japan Display Inc., Tokyo (JP)

(72) Inventors: Masafumi Okada, Tokyo (JP); Nobuyuki Suzuki, Tokyo (JP); Makoto Hasegawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/888,242

(22) Filed: Sep. 18, 2024

(65) Prior Publication Data

US 2025/0146648 A1 May 8, 2025

(30) Foreign Application Priority Data

Nov. 8, 2023 (JP) .................... 2023-190858

(51) Int. Cl.
*F21V 13/04* (2006.01)
*F21Y 115/10* (2016.01)
*G02B 17/08* (2006.01)

(52) U.S. Cl.
CPC .......... *F21V 13/04* (2013.01); *G02B 17/0868* (2013.01); *F21Y 2115/10* (2016.08)

(58) Field of Classification Search
CPC ......... F21V 5/04–048; F21V 13/04–06; F21Y 2115/10; G02B 17/0868–0872
See application file for complete search history.

(56) References Cited

U.S. PATENT DOCUMENTS 6,547,423 B2 * 4/2003 Marshall ................... F21V 5/04
362/255

FOREIGN PATENT DOCUMENTS

| JP | 2015060631 A | 3/2015 |
| JP | 2016033886 A | 3/2016 |
| JP | 2018088326 A | 6/2018 |

* cited by examiner

Primary Examiner — Jason M Han
(74) Attorney, Agent, or Firm — Maier & Maier, PLLC

(57) ABSTRACT

The incident surface is the inner surface of a recess including a bottom surface and an inwardly convex inner side. A tangent line on the free-form curve forms a smaller angle with the optical axis at a point closer to the bottom surface and a larger angle with the optical axis at a point farther from the bottom surface. The free-form curve has a curvature that is not constant. The curvature is maximized at a depth of one-third or less of a depth of the recess. The light enters the bottom surface only at a light distribution angle of three degrees. The light enters the inner side at a light distribution angle of more than three degrees. Light incident on the bottom surface exits through the emitting surface. Light incident on the inner side reflects off the outer side and exits through the emitting surface.

10 Claims, 5 Drawing Sheets

LIGHTING DEVICE

CROSS-REFERENCE TO RELATED APPLICATION

The present application claims priority from Japanese patent application JP2023-190858 filed on Nov. 8, 2023, the contents of which are hereby incorporated by reference into this application.

BACKGROUND

1. Field

This disclosure relates to a lighting device.

2. Description of the Related Art

Some lighting devices require light (ideally collimated light) with a narrow distribution angle (JP 2018-88326 A). To obtain collimated light, a collimator lens can be used (JP 2015-60631 A). Conversely, J P 2016-33886 A discloses a lens for achieving a desired light distribution angle.

A collimator lens with refractive and reflective surfaces has limitations in increasing the curvature of the refractive surface, making it difficult to achieve a narrow light distribution angle.

SUMMARY

This disclosure aims to narrow the light distribution angle.

A lighting device includes: a light source capable of emitting light; and a collimator lens including an incident surface for the light and an emitting surface for the light, the collimator lens including an outer side capable of internally reflecting the light, the outer side surrounding the incident surface and the emitting surface, the incident surface being an inner surface of a recess that faces the light source, the inner surface of the recess including a bottom surface and an inner side, the inner side being shaped by rotating a free-form curve, which is convex inwardly in the recess, around an optical axis of the light, a tangent line on the free-form curve forming a smaller angle with the optical axis at a point closer to the bottom surface and a larger angle with the optical axis at a point farther from the bottom surface, the free-form curve having a curvature that is not constant, the curvature being maximized at a depth of one-third or less of a depth of the recess, the light being directed onto the bottom surface only at a light distribution angle of three degrees or less relative to the optical axis, the light being directed onto the inner side at a light distribution angle of more than three degrees relative to the optical axis, light incident on the bottom surface exiting through the emitting surface, light incident on the inner side reflecting off the outer side and exiting through the emitting surface.

DETAILED DESCRIPTION

Figure 1:
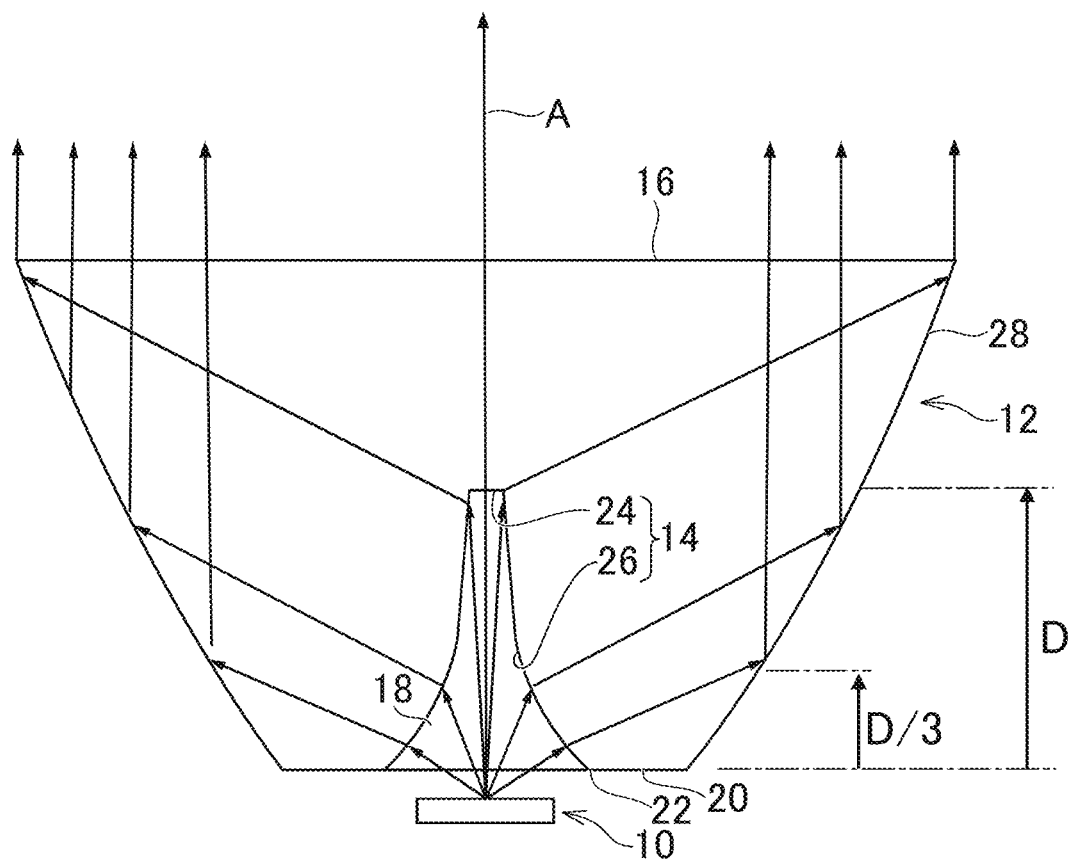
FIG. 1 is a schematic cross-sectional view of a lighting device according to an embodiment.

Hereinafter, some embodiments will be described with reference to the drawings. Here, the invention can be embodied according to various aspects within the scope of the invention without departing from the gist of the invention and is not construed as being limited to the content described in the embodiments exemplified below.

The drawings are further schematically illustrated in widths, thickness, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

FIG. 1 is a schematic cross-sectional view of a lighting device according to an embodiment. The lighting device includes a light source 10 (e.g., a light-emitting diode or a filament). The light source 10 is capable of emitting light (e.g., white light) spreading from the optical axis A (central axis of luminous flux). The distribution angle of the light is less than 180 degrees (e.g., from 120 degrees to 130 degrees).

The lighting device includes a collimator lens 12. The collimator lens 12 is made of transparent resin or optical glass. The collimator lens 12 includes an incident surface 14 and an emitting surface 16, for the light.

The collimator lens 12 has a recess 18 facing the light source 10. The light from the light source 10 is entirely directed onto the inner surface of the recess 18. The inner surface of the recess 18 is the incident surface 14 for the light. The light source 10 is outside the recess 18. The collimator lens 12 has a rear surface 20 that is flat and spreads in a direction perpendicular to the optical axis A, around the recess 18. The opening 22 of the recess 18 is circular.

The inner surface of the recess 18 includes a bottom surface 24 smaller than the opening 22. The bottom surface 24 is a flat surface perpendicular to the optical axis A. The light is directed onto the bottom surface 24 only at a distribution angle of three degrees or less relative to the optical axis A. The bottom surface 24 is a part of the incident surface 14 for the light.

The inner surface of the recess 18 includes an inner side 26. The inner side 26 tapers toward the bottom surface 24. The inner side 26 is another part of the incident surface 14 (e.g., all except the bottom surface 24) for the light. The light is directed onto the inner side 26 at a distribution angle of more than three degrees relative to the optical axis A. The light hardly enters the bottom surface 24, and much light enters the inner side 26. The light incident on the inner side 26 is refracted at the inner side 26.

The inner side 26 is shaped by rotating a free-form curve, which is convex inwardly in the recess 18, around the optical axis A. The tangent line on the free-form curve forms a smaller angle with the optical axis A at a point closer to the bottom surface 24. That is, the inner side 26 is upright at a position near the bottom surface 24. The tangent line on the free-form curve forms a larger angle with the optical axis A at a point farther from the bottom surface 24. That is, the inner side 26 is greatly inclined at a position far from the bottom surface 24. The free-form curve has a curvature that is not constant. The curvature is maximized at a depth of one-third or less of the depth D of the recess 18, from the rear surface 20.

The collimator lens 12 includes an outer side 28. The outer side 28 is around the incident surface 14. The light incident on the inner side 26 reflects off the outer side 28. The outer side 28 is capable of internally reflecting part of the light (light refracted at the inner side 26). The outer side 28 is a curved surface convex in the direction opposite to the optical axis A. The curved surface is shaped by rotating a curve around the optical axis A. The curved surface is shaped to reflect light, which has been refracted at the inner surface 26 and comes directly, so that it heads parallel to the optical axis A toward the emission surface 16. The outer side 28 may be covered with a light-reflecting film. Reflected light at the outer side 28 exits from the emitting surface 16.

The light incident on the bottom surface 24 exits from the emitting surface 16. The emitting surface 16 for the light is a flat surface perpendicular to the optical axis A. The emitting surface 16 is circular. In diameter, the opening 22 of the recess 18 is one-fifth or less of the emitting surface 16. The outer side 28 is around the emitting surface 16. The light exiting from the emitting surface 16 includes light incident from the bottom surface 24 and reflected light off the outer side 28. The reflected light is light from the inner side 26.

Figure 2:
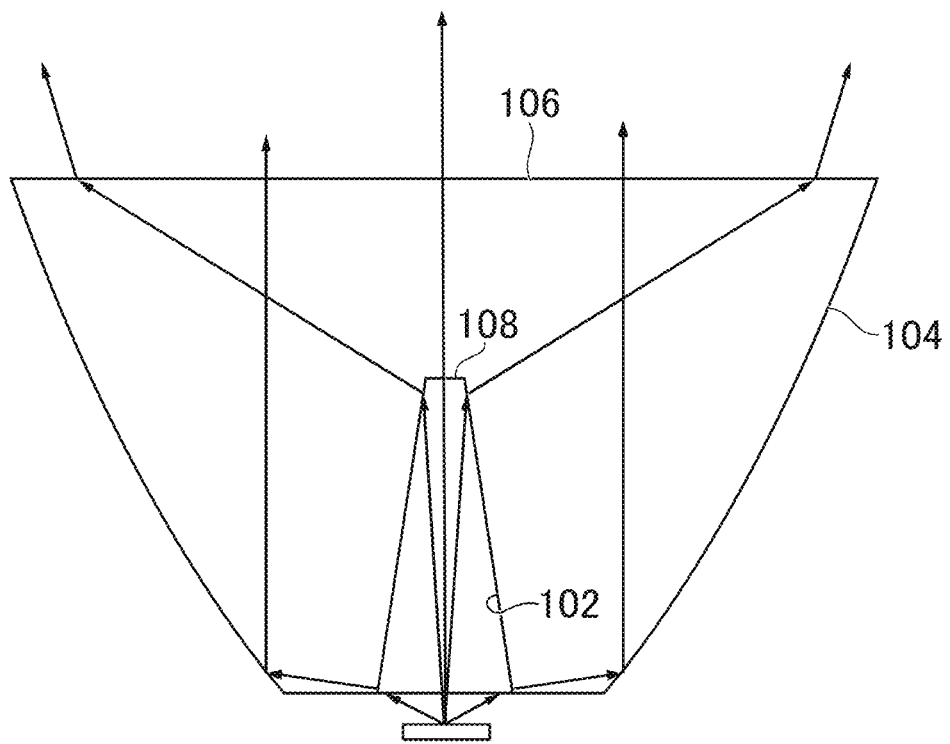
FIG. 2 is a schematic cross-sectional view of a lighting device according to related art.

FIG. 2 is a schematic cross-sectional view of a lighting device according to related art. Here, the inner side 102 is shaped by rotating a straight line inclined at an angle of 10 degrees or more and 20 degrees or less relative to the optical axis A around the optical axis A. The light refracted near the bottom surface 108 of the inner side 102 with such a shape does not head toward the outer side 104, but proceeds to the emitting surface 106, refracts at the emitting surface 106, and is emitted. As a result, the light spreads.

In contrast, in this embodiment, as shown in FIG. 1, since the inner side 26 near the bottom surface 24 has a smaller angle with the optical axis A, the refracted light heads toward the outer side 28. This suppresses the spread of light and narrows the distribution angle. On the other hand, since the inner side 26 far from the bottom surface 24 has a larger angle with the optical axis A, the height along the optical axis A is lower. This reduces the thickness of the collimator lens 12.

Figure 3:
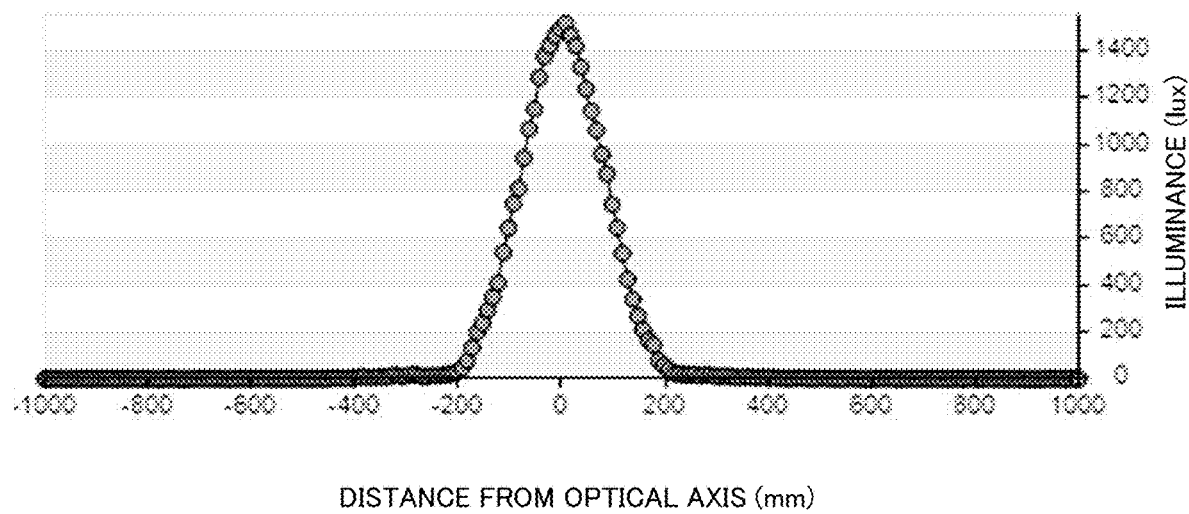
FIG. 3 is an illuminance distribution diagram of a lighting device according to an embodiment.

FIG. 3 is an illuminance distribution diagram of the lighting device according to the embodiment. It can be seen that the spread of light is almost contained within ±200 mm.

Figure 4:
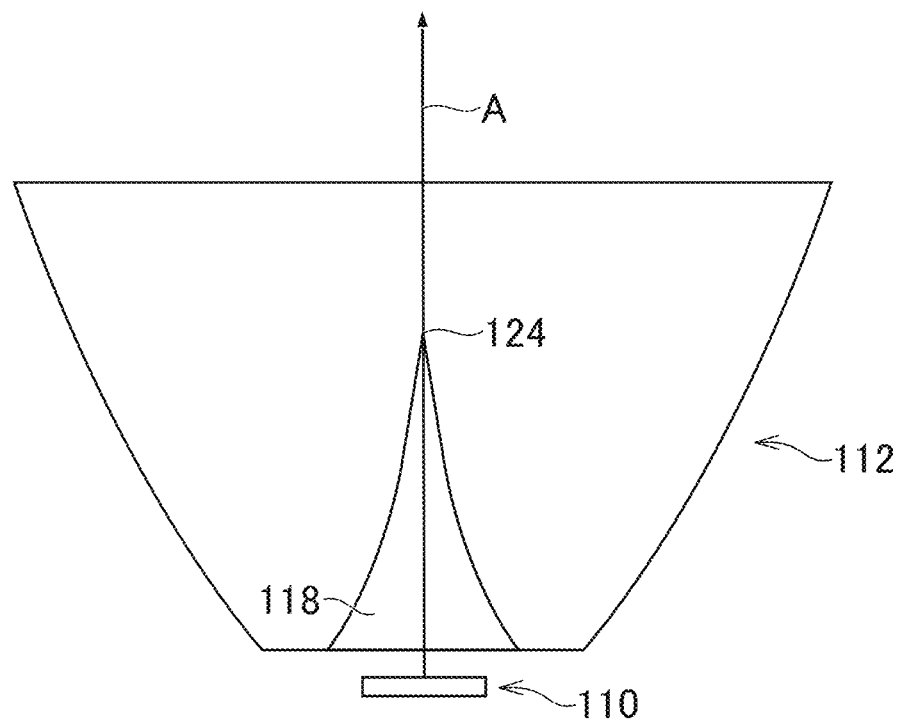
FIG. 4 is a schematic cross-sectional view of a lighting device according to a modified example of the embodiment.

FIG. 4 is a schematic cross-sectional view of a lighting device according to a modified example of the embodiment. In this modified example, the bottom surface 124 of the recess 118 of the collimator lens 112 is substantially a point. Accordingly, only light almost parallel to the optical axis A, from the light source 110, is incident on the bottom surface 124, and exits from the emitting surface almost without refraction.

Figure 5:
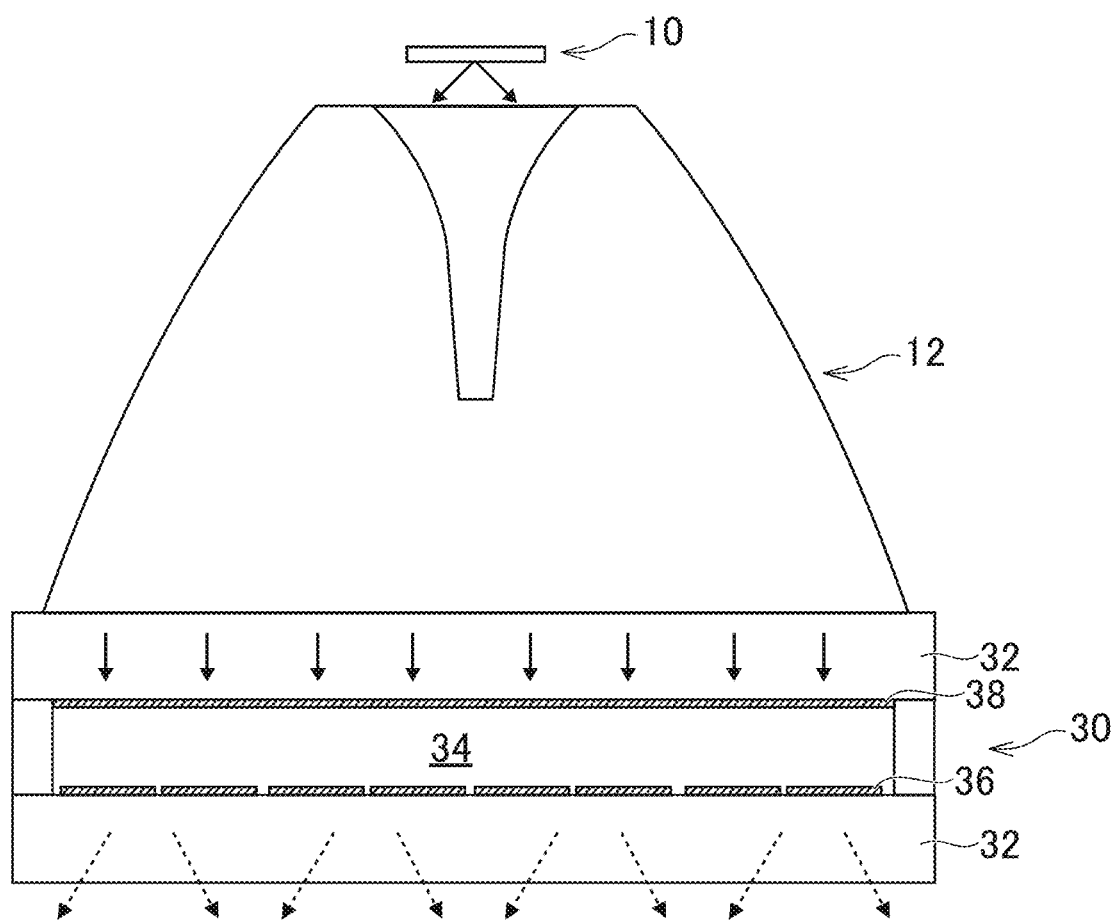
FIG. 5 is a schematic cross-sectional view of a lighting device according to an applied example of the embodiment.

FIG. 5 is a schematic cross-sectional view of a lighting device according to an applied example of the embodiment. The lighting device includes a lens panel 30 in addition to the light source 10 and the collimator lens 12. The lens panel 30 includes a pair of transparent substrates 32. A polymer-dispersed liquid crystal layer 34 is interposed between the pair of transparent substrates 32. The liquid crystal layer 34 is between the first electrode 36 and the second electrode 38. The first electrode 36 and the second electrode 38 are transparent. When no voltage is applied between the first electrode 36 and the second electrode 38, light travels straight through the liquid crystal layer 34, and the direction of light travel does not change. In contrast, when a voltage is applied between the first electrode 36 and the second electrode 38, the light is scattered by the liquid crystal layer 34. Thus, the distribution angle of the light can be adjusted.

The embodiments described above are not limited and different variations are possible. The structures explained in the embodiments may be replaced with substantially the same structures and other structures that can achieve the same effect or the same objective.

OUTLINE OF THE EMBODIMENT (1) A lighting device including: a light source 10 capable of emitting light; and a collimator lens 12 including an incident surface 14 for the light and an emitting surface 16 for the light, the collimator lens 12 including an outer side 28 capable of internally reflecting the light, the outer side 28 surrounding the incident surface 14 and the emitting surface 16, the incident surface 14 being an inner surface of a recess 18 that faces the light source 10, the inner surface of the recess 18 including a bottom surface 24 and an inner side 26, the inner side 26 being shaped by rotating a free-form curve, which is convex inwardly in the recess 18, around an optical axis A of the light, a tangent line on the free-form curve forming a smaller angle with the optical axis A at a point closer to the bottom surface 24 and a larger angle with the optical axis A at a point farther from the bottom surface 24, the free-form curve having a curvature that is not constant, the curvature being maximized at a depth of one-third or less of a depth of the recess 18, the light being directed onto the bottom surface 24 only at a light distribution angle of three degrees or less relative to the optical axis A, the light being directed onto the inner side 26 at a light distribution angle of more than three degrees relative to the optical axis A, light incident on the bottom surface 24 exiting through the emitting surface 16, light incident on the inner side 26 reflecting off the outer side 28 and exiting through the emitting surface 16.

The inner side 26, if it is closer to the bottom surface 24, forms a smaller angle with the optical axis A, causing the refracted light to move toward the outer side 28. This helps to suppress the spread of light and narrow the distribution angle. Additionally, the inner side 26, if it is farther from the bottom surface 24, forms a larger angle with the optical axis, allowing for a reduction in the height along the optical axis A. This enables the thickness of the collimator lens to be reduced.

(2) The lighting device according to (1), wherein the bottom surface 24 is a flat surface that is perpendicular to the optical axis A.

(3) The lighting device according to (1) or (2), wherein the emitting surface 16 is a flat surface that is perpendicular to the optical axis A.

(4) The lighting device according to any one of (1) to (3), wherein the light from the light source 10 is entirely directed onto the inner surface of the recess 18.

(5) The lighting device according to any one of (1) to (4), wherein the light source 10 is located outside the recess 18, and the light distribution angle is less than 180 degrees.

(6) The lighting device according to any one of (1) to (5), wherein the outer surface is a curved surface that is convex in a direction opposite to the optical axis A, and the curved surface is shaped by rotating a curve around the optical axis A.

(7) The lighting device according to any one of (1) to (6), wherein the collimator lens 12 has a rear surface 20 around the recess 18, the rear surface 20 being flat and spreading in a direction perpendicular to the optical axis A.

(8) The lighting device according to any one of (1) to (7), wherein the emitting surface 16 and an opening 22 of the recess 18 are circular, and the opening 22 is one-fifth or less of a diameter of the emitting surface 16.

(9) The lighting device according to any one of (1) to (8), wherein the collimator lens 12 is made of transparent resin or optical glass.

(10) The lighting device according to any one of (1) to (9), wherein the light source 10 is a light-emitting diode or a filament.

What is claimed is:

1. A lighting device comprising:
   a light source capable of emitting light; and
   a collimator lens including an incident surface for the light and an emitting surface for the light, the collimator lens including an outer side capable of internally reflecting the light, the outer side surrounding the incident surface and the emitting surface,
   the incident surface being an inner surface of a recess that faces the light source,
   the inner surface of the recess including a bottom surface and an inner side,
   the inner side being shaped by rotating a free-form curve, which is convex inwardly in the recess, around an optical axis of the light,
   a tangent line on the free-form curve forming a smaller angle with the optical axis at a point closer to the bottom surface and a larger angle with the optical axis at a point farther from the bottom surface,
   the free-form curve having a curvature that is not constant,
   the curvature being maximized at a depth of one-third or less of a depth of the recess,
   the light being directed onto the bottom surface only at a light distribution angle of three degrees or less relative to the optical axis, the light being directed onto the inner side at a light distribution angle of more than three degrees relative to the optical axis,
   light incident on the bottom surface exiting through the emitting surface,
   light incident on the inner side reflecting off the outer side and exiting through the emitting surface.

2. The lighting device according to claim 1, wherein the bottom surface is a flat surface that is perpendicular to the optical axis.

3. The lighting device according to claim 1, wherein the emitting surface is a flat surface that is perpendicular to the optical axis.

4. The lighting device according to claim 1, wherein the light from the light source is entirely directed onto the inner surface of the recess.

5. The lighting device according to claim 1, wherein the light: source is located outside the recess, and the light distribution angle is less than 180 degrees.

6. The lighting device according to claim 1, wherein the outer surface is a curved surface that is convex in a direction opposite to the optical axis, and the curved surface is shaped by rotating a curve around the optical axis.

7. The lighting device according to claim 1, wherein the collimator lens has a rear surface around the recess, the rear surface being flat and spreading in a direction perpendicular to the optical axis.

8. The lighting device according to claim 1, wherein the emitting surface and an opening of the recess are circular, and the opening is one-fifth or less of a diameter of the emitting surface.

9. The lighting device according to claim 1, wherein the collimator lens is made of transparent resin or optical glass.

10. The lighting device according to claim 1, wherein the light source is a light-emitting diode or a filament.

\* \* \* \* \*